(12) United States Patent
Kim

(10) Patent No.: US 8,552,761 B2
(45) Date of Patent: Oct. 8, 2013

(54) FLIP-FLOP INCLUDING KEEPER CIRCUIT

(75) Inventor: Min Su Kim, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/238,594

(22) Filed: Sep. 21, 2011

(65) Prior Publication Data
US 2012/0114068 A1    May 10, 2012

(30) Foreign Application Priority Data
Nov. 8, 2010   (KR) ................... 10-2010-0110476

(51) Int. Cl.
*H03K 19/00* (2006.01)
(52) U.S. Cl.
USPC ................................ 326/93; 326/95; 326/98
(58) Field of Classification Search
USPC ............. 326/93, 95–98; 327/200–203, 208, 327/211, 212, 218
See application file for complete search history.

(56) References Cited

U.S. PATENT DOCUMENTS

| 6,693,459 | B2 | 2/2004 | Nedovic et al. |
| 7,391,250 | B1 | 6/2008 | Chuang |
| 7,436,220 | B2 | 10/2008 | Anshumali et al. |
| 2007/0273420 | A1* | 11/2007 | Torvi et al. ............ 327/202 |
| 2009/0121764 | A1* | 5/2009 | Uemura et al. ............ 327/203 |

FOREIGN PATENT DOCUMENTS

KR   10-2009-0040519   4/2009

* cited by examiner

*Primary Examiner* — Anh Tran
(74) *Attorney, Agent, or Firm* — Stanzione & Kim, LLP

(57) ABSTRACT

A flip-flop includes a transmission circuit configured to transmit data to a transmission line in response to a clock signal and a complementary clock signal. The flip-flop further includes a keeper circuit configured to latch data of the transmission line in response to the clock signal and the complementary clock signal to maintain the data of the transmission line constant.

12 Claims, 15 Drawing Sheets

FLIP-FLOP INCLUDING KEEPER CIRCUIT

CROSS-REFERENCE TO RELATED APPLICATIONS

This application claims priority under 35 U.S.C. §119(a) from Korean Patent Application No. 10-2010-00110476 filed on Nov. 8, 2010, the disclosure of which is hereby incorporated by reference in its entirety.

BACKGROUND OF THE INVENTION

1. Field of the Invention

The present general inventive concept relates to a flip-flop, and more particularly, to a flip-flop including a keeper circuit.

2. Description of the Related Art

The design of a flip-flop is essential to designing a high-speed chip. A data storage device like a flip-flop needs to store a certain logic value according to the cycle time of a clock signal. When the length of an interconnection wire increases, external coupling noise affects the interconnection wire, and therefore, data stored in the flip-flop is more likely to be distorted.

SUMMARY OF THE INVENTION

At least one exemplary embodiment of the present general inventive concept provides a flip-flop including a keeper circuit to prevent data from being distorted by coupling noise.

Additional features and utilities of the present general inventive concept will be set forth in part in the description which follows and, in part, will be obvious from the description, or may be learned by practice of the general inventive concept.

According to an exemplary embodiment of the present general inventive concept, there is provided a flip-flop including a transmission circuit configured to transmit data to a transmission line in response to a clock signal and a complementary clock signal; and a keeper circuit configured to latch data of the transmission line in response to the clock signal and the complementary clock signal to keep the data of the transmission line constant.

The keeper circuit may include a first tri-state inverter configured to invert and output the data of the transmission line in response to the clock signal and the complementary clock signal, a latch circuit configured to latch data output from the first tri-state inverter, and an inverter configured to transmit data output from the latch circuit to the transmission line.

The latch circuit may include a plurality of inverters connected in series to one another.

The inverter may be a second tri-state inverter which operates in response to the clock signal and the complementary clock signal. The flip-flop may further include an inverter connected to the transmission line. The transmission circuit may include a tri-state inverter configured to transmit the data to the transmission line in response to the clock signal and the complementary clock signal.

According to another exemplary embodiment of the present general inventive concept, there is provided a flip-flop including a first transmission circuit configured to transmit data to a first transmission line in response to a clock signal, a first latch circuit configured to latch data of the first transmission line, a second transmission circuit configured to transmit the data of the first transmission line to a second transmission line in response to the clock signal and the data of the first transmission line, and a keeper circuit configured to latch data of the second transmission line in response to the clock signal and a complementary clock signal to keep the data of the second transmission line constant.

The keeper circuit may include a tri-state inverter configured to invert and output the data of the second transmission line in response to the clock signal and the complementary clock signal, a second latch circuit configured to latch data output from the tri-state inverter, and an inverter configured to transmit data output from the second latch circuit to the second transmission line.

The second latch circuit may include a plurality of inverters connected in series to one another. One of the plurality of inverters may be a tri-state inverter which operates in response to the clock signal and the complementary clock signal. The first transmission circuit may include a tri-state inverter configured to transmit the data to the first transmission line in response to the clock signal and the complementary clock signal.

According to yet another exemplary embodiment of the present general inventive concept, there is provided a flip-flop including a first transmission circuit configured to transmit data to a first transmission line in response to a clock signal and a complementary clock signal, a first latch circuit configured to latch data of the first transmission line, a second transmission circuit configured to transmit the data of the first transmission line to a second transmission line in response to the data of the first transmission line and data of a third transmission line, and a keeper circuit configured to latch data of the second transmission line in response to the clock signal and the complementary clock signal to keep the data of the second transmission line and to transmit latched data to the third transmission line.

The keeper circuit may include a tri-state inverter configured to invert and output the data of the second transmission line in response to the clock signal and the complementary clock signal, a second latch circuit configured to latch data output from the tri-state inverter, a switching circuit configured to transmit data output from the second latch circuit to the third transmission line in response to the clock signal and the complementary clock signal, a first precharge circuit configured to precharge the second transmission line in response to data of the third transmission line, and a second precharge circuit configured to precharge the third transmission line in response to the complementary clock signal.

The second latch circuit may include a plurality of inverters connected in series to one another and one of the plurality of inverters may be a tri-state inverter which operates in response to the clock signal and the complementary clock signal. Each of the first and precharge circuits may be a P-type metal-oxide-semiconductor (PMOS) transistor.

The first transmission circuit may include a pull-up circuit configured to pull up the first transmission line to a voltage level of a power supply in response to the clock signal and a pull-down circuit connected between the first transmission line and a ground to pull down the first transmission line to a voltage level of the ground in response to the data and the clock signal.

In yet another feature of the present general inventive concept, a keeper circuit to maintain data transmitted on a transmission line of a flip-flop comprise an input unit to detect a clock signal and a complimentary clock signal having an inverse duty cycle with respect to the clock signal and to generate storage data based on the data on the transmission line in response to the clock signal existing at a first latch value and the complimentary clock signal existing at a second latch value that is opposite the first latch value, at least one memory element to store the storage data generated by the input unit in response to a first state-change of the clock signal, and an output unit that generates maintained data based on the storage data stored in the at least one memory element and that outputs the maintained data to the transmission line in response to a second state-change of the clock-signal.

BRIEF DESCRIPTION OF THE DRAWINGS

The above and other features and/or utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
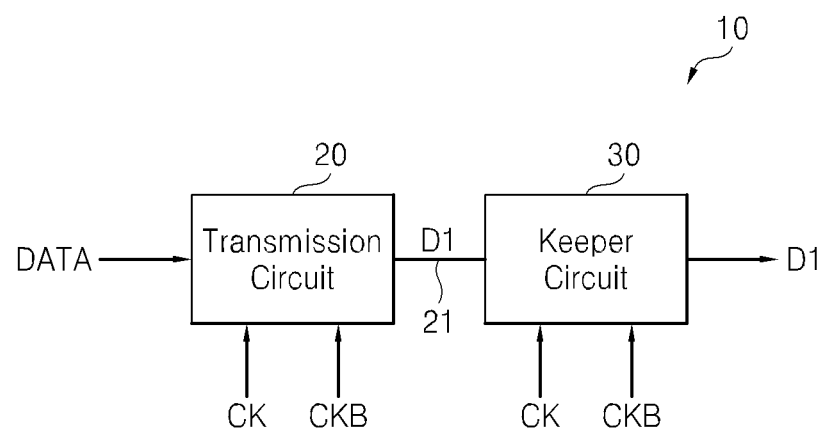
FIG. 1 is a block diagram of a flip-flop according to the concept of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a flip-flop 10 according to the concept of the present general inventive concept. The flip-flop 10 includes a transmission circuit 20 and a keeper circuit 30.

The transmission circuit 20 receives data (DATA), and transmits data D1 to a transmission line 21 in response to a clock signal CK and a complementary clock signal CKB. The clock signal CK and the complimentary clock signal CKB oscillate between high and low states. The complimentary clock signal CKB may be generated to have a phase that is inversed with respect to the clock signal CK. That is, the frequency of complementary clock signal CKB may be shifted 180 degrees from the clock signal CK. It is appreciated that a high state may include a logic "1" value and a low state may include a logic "0" value. Further, a logic "1" value may include, but is not limited to 5V and/or approximately 5V, and a logic "0" may include, but is not limited to 0V and/or approximately 0V.

Generally, a transmission line is susceptible to coupling noise. When coupling noise exists, improper data may be realized on the transmission line. The keeper circuit 30 latches the data D1 of the transmission line 21 in response to the clock signal CK and the complementary clock signal CKB to keep the data D1 constant and outputs the latched data D1. Accordingly, the correct data D1 is maintained and realized on the transmission line 21, as discussed further below.

Figure 2:
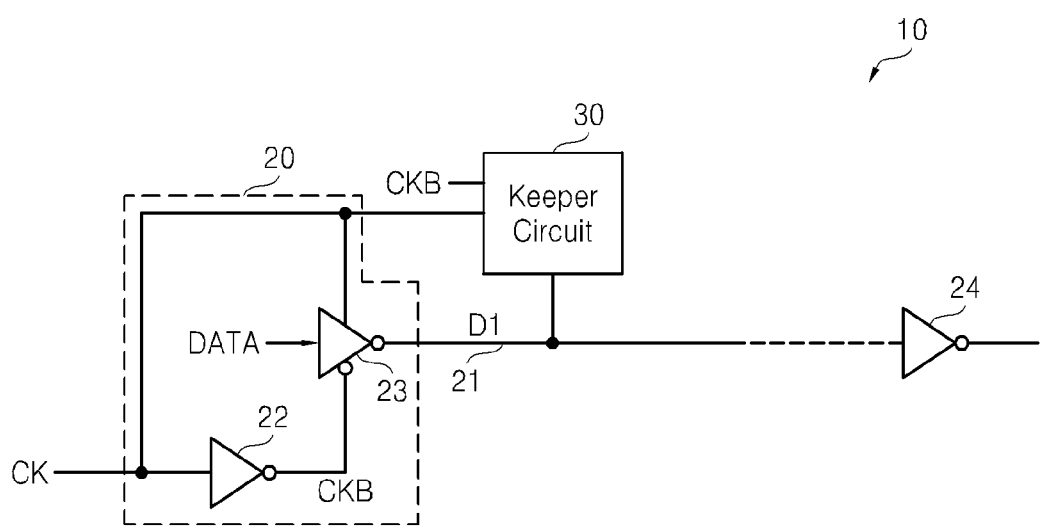
FIG. 2 is a circuit diagram of the flip-flop according to another exemplary embodiment of the present general inventive concept.

FIG. 2 is a circuit diagram of the flip-flop 10 according to some embodiments of the present general inventive concept. Referring to FIGS. 1 and 2, the flip-flop 10 includes the transmission circuit 20 and the keeper circuit 30. The flip-flop 10 may also include an inverter 24 which inverts the data D1 of the transmission line 21.

The transmission circuit 20 includes an inverter 22 that inverts the clock signal CK to generate a complementary clock signal CKB. The transmission circuit 20 also includes a first tri-state inverter 23 operating in response to the clock signal CK and the complementary clock signal CKB. The first tri-state inverter 23 includes an active high input connected to the clock signal CK, and an active low input connected to the complementary clock signal CKB. It is appreciated that an active high input may include a logic "1" input and an active low input may include an logic "0" input. Further, a logic "1" input may include, but is not limited to, 5V and a logic "0"

may include, but is not limited to 0V. The first tri-state inverter 23 may transmit the data DATA to the transmission line 21 in response to the clock signal CK and the complementary clock signal CKB. For instance, the first tri-state inverter 23 may receive data DATA, and transmit the data D1 to the transmission line 21 in response to the clock signal CK at a high level and the complementary clock signal CKB at a low level.

FIGS. 3A through 3F are circuit diagrams of examples of the first tri-state inverter 23 according to some embodiments of the present general inventive concept. The first tri-state inverter 23 illustrated in FIG. 2 may be implemented in various exemplary circuits, as illustrated in FIGS. 3A through 3F.

Circuits illustrated in FIGS. 3B through 3E include two P-type metal-oxide-semiconductor (PMOS) transistors P1 and P2 and two N-type metal-oxide-semiconductor (NMOS) transistors N1 and N2, which are connected between a power supply and a ground.

Each of the two PMOS transistors P1 and P2 operates in response to an input signal IN or the complementary clock signal CKB. Each of the two NMOS transistors N1 and N2 operates in response to the input signal IN or the clock signal CK. A drain of the PMOS transistor P2 and a drain of the NMOS transistor N1 are connected to an output terminal OUT.

Figure 3A:
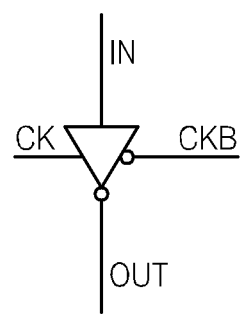
FIGS. 3A through 3F are circuit diagrams of examples of a tri-state inverter according to another exemplary embodiment of the present general inventive concept.
Figure 3B:
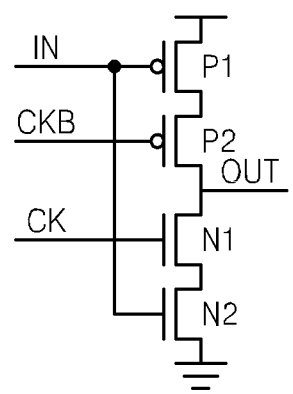
Figure 3C:
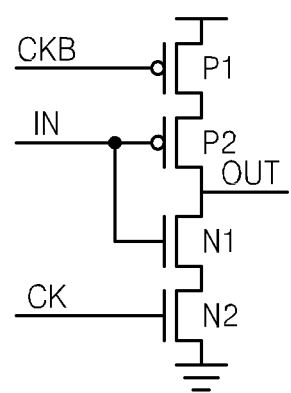
Figure 3D:
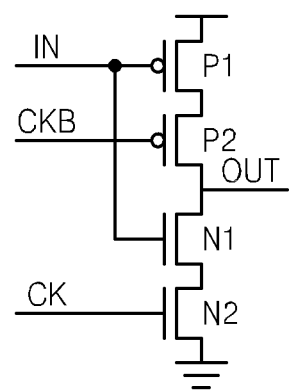
Figure 3E:
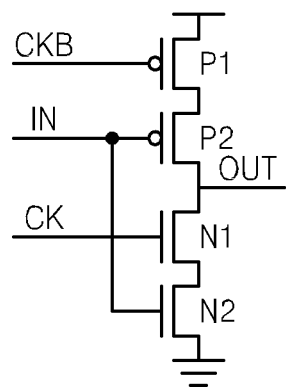

Referring to FIG. 3B, for example, when CKB is low and CK is high, the second PMOS P2 and the first NMOS N1 are switched on, respectively. Accordingly, if input data IN received by the tri-state inverter 23 is high, the first PMOS P1 is switched off and the second NMOS N2 is switched on. Accordingly, the output OUT of the tri-state inverter 23 is pulled down to the ground source realized by the drain of the second NMOS N2, such that the output is low. However, if the input data IN is low when the CK is high and CKB is low, the first PMOS P1 is switched on, while the second NMOS N2 is switched off. Accordingly, the output OUT of the tri-state is pulled up to the voltage level realized by the source of the first PMOS P1, and the output OUT of the tri-state inverter 23 is high.

Figure 3F:
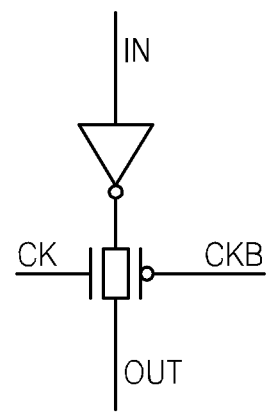

Another example of a tri-state inverter 23 is shown in an exemplary circuit illustrated in FIG. 3F. The tri-state inverter 23 includes an inverter and a transmission gate transmitting an output signal of the inverter in response to the clock signal CK and the complementary clock signal CKB. Here, the data DATA illustrated in FIG. 2 is the input signal IN and the data D1 output from the transmission circuit 20 illustrated in FIG. 2 is data output through the output terminal OUT.

Figure 4:
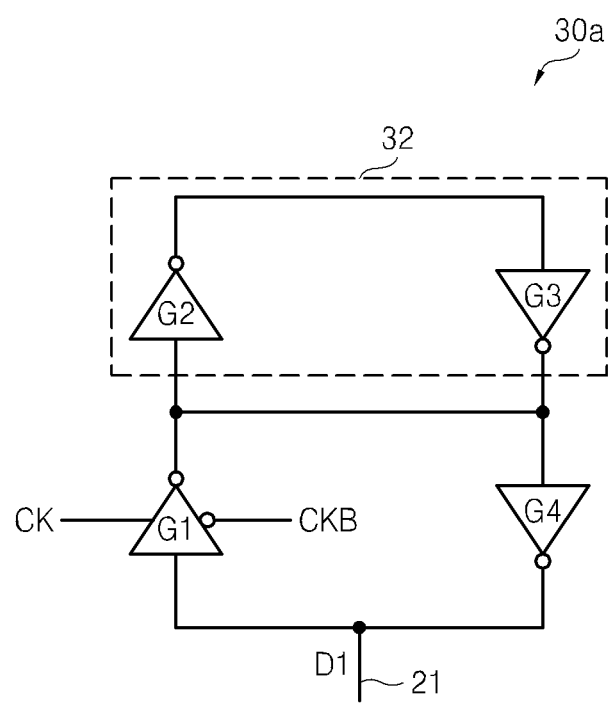
FIG. 4 is a circuit diagram of a keeper circuit included in the flip-flop illustrated in FIG. 1, according to another exemplary embodiment of the present general inventive concept.

FIG. 4 is a circuit diagram of a keeper circuit 30a included in the flip-flop 10 illustrated in FIG. 1, according to some embodiments of the present general inventive concept. The keeper circuit 30a is capable of latching data D1 transmitted on the transmission line 21, such that the data D1 is maintained, despite the existence of coupling noise on the transmission line 21.

Referring to FIG. 4, the keeper circuit 30a includes an input unit, such as a second tri-state inverter G1, to input data into the keeper circuit 30a, at least one storage element, such as a latch circuit 32 including inverters G2 and G3 connected in series with each other, to store the data input to the keeper circuit, and an output unit, such as inverter G4, to output data from keeper circuit 30a to the transmission line 21 to maintain the data transmitted on the transmission line 21. The second tri-state inverter G1 inverts the data D1 of the transmission line 21 in response to the clock signal CK and the complementary clock signal CKB. The latch circuit 32 latches data output from the second tri-state inverter G1. The inverter G4 inverts data output from the latch circuit 32, and transmits inverted data to the transmission line 21. Accordingly, the data D1 transmitted on the transmission line 21 may be maintained.

Figure 5:
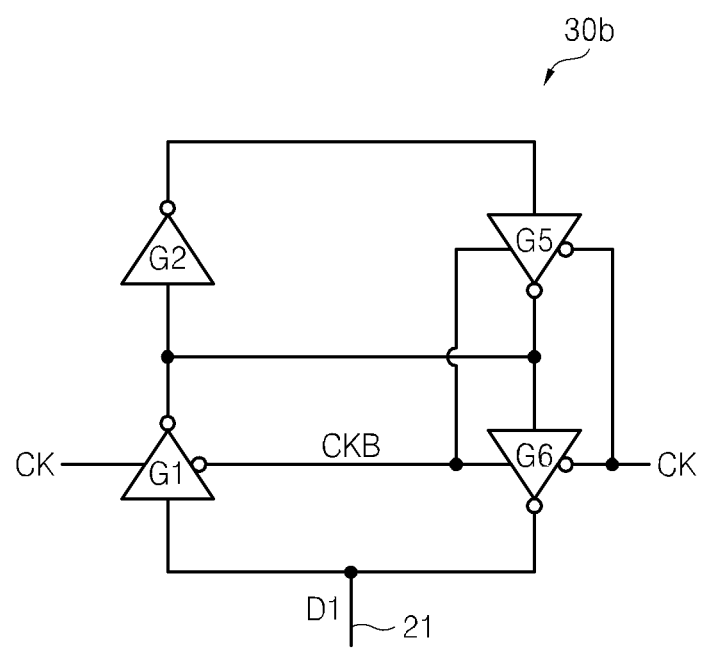
FIG. 5 is a circuit diagram of a keeper circuit included in the flip-flop illustrated in FIG. 1, according to another exemplary embodiment of the present general inventive concept.

FIG. 5 is a circuit diagram of a keeper circuit 30b included in the flip-flop 10 illustrated in FIG. 1, according to another exemplary embodiment of the present general inventive concept. Referring to FIG. 5, the keeper circuit 30b includes a plurality of second tri-state inverters G1, G5, and G6 and the inverter G2. The second tri-state inverter G1 operates similar to the second tri-state inverter G1 illustrated in FIG. 4, and inverts the data D1 of the transmission line 21 in response to the clock signal CK and the complementary clock signal CKB. The second tri-state inverters G5 and G6 each include an active low input connected to the clock signal CK, and an active high input connected to the complimentary clock signal.

The inverter G2 inverts data output from the second tri-state inverter G1. The third tri-state inverter G5 inverts data output from the inverter G2 in response to the clock signal CK and the complementary clock signal CKB. The fourth tri-state inverter G6 inverts data output from the third tri-state inverter G5 in response to the clock signal CK and the complementary clock signal CKB, and transmits inverted data to the transmission line 21. An output terminal of the third tri-state inverter G5 is connected with an input terminal of the inverter G2. Accordingly, the second tri-state inverters G5 and G6 operate to output the data stored in the keeper circuit 30b to the transmission line 21 based the clock signal and the complimentary clock signal. For instance, when the clock signal CK is high and the complimentary clock signal CKB is low, data D1 from the transmission line 21 is inverted by the tri-state inverter G1, and the inverted data is input to the keeper circuit 30b where it stored. When each of the clock signal CK and the complementary clock signal CKB transition to opposite values, i.e., CK transition to low and CKB transitions to high, data stored in the keeper circuit 30b is delivered by the tri-state inverter G5 to the tri-state inverter G6. Accordingly, the tri-state inverter G6 inverts the data stored in the keeper circuit 30b, and outputs the data D1 to maintain the data on the transmission line 21.

The operations of the flip-flop 10 will be described with reference to FIGS. 2 and 4. When the clock signal CK is at the high level and the complementary clock signal CKB is at the low level, the first tri-state inverter 23 is turned on. Accordingly, the input data DATA received by the first tri-state inverter 23 is inverted, and the inverted data generated by the tri-state inverter 23 is output to the transmission line 21 as data D1, where it is delivered to the keeper circuits 30 or 30a.

Additionally, when the clock signal CK is at the high level and the complementary clock signal CKB is at the low level, the second tri-state inverter G1 of the keeper circuit 30/30a is turned on and inverts the data D1 of the transmission line 21 to the latch circuit 32. When the clock signal CK transitions from the high level to a low level, the first and second tri-state inverters 23 and G1, respectively, are turned off and the inverted data D1 from the second tri-state inverter G1 is stored in the keeper circuit 30 or 30a When the clock signal CK returns to the high level, the latch circuit 32 of the keeper circuit 30/30a inverts the data stored therein and outputs the data D1 to the transmission line 21. Accordingly, even though coupling noise may occur in the transmission line 21, the data D1 of the transmission line 21 is the same as the data D1 output by the keeper circuit 30 or 30a. Consequently, the data D1 of the transmission line 21 is not affected by the coupling noise.

The operations of the flip-flop 10 including another exemplary embodiment of a keeper circuit 30b illustrated in FIG. 5 are substantially the same as or similar to those of the flip-flop 10 including the keeper circuit 30a illustrated in FIG. 4, with the exception that the inverters G3 and G4 illustrated in FIG. 4 are respectively replaced by the tri-state inverters G5 and G6. Thus, descriptions of the operations of the flip-flop 10 including the keeper circuit 30b will be omitted.

Figure 6:
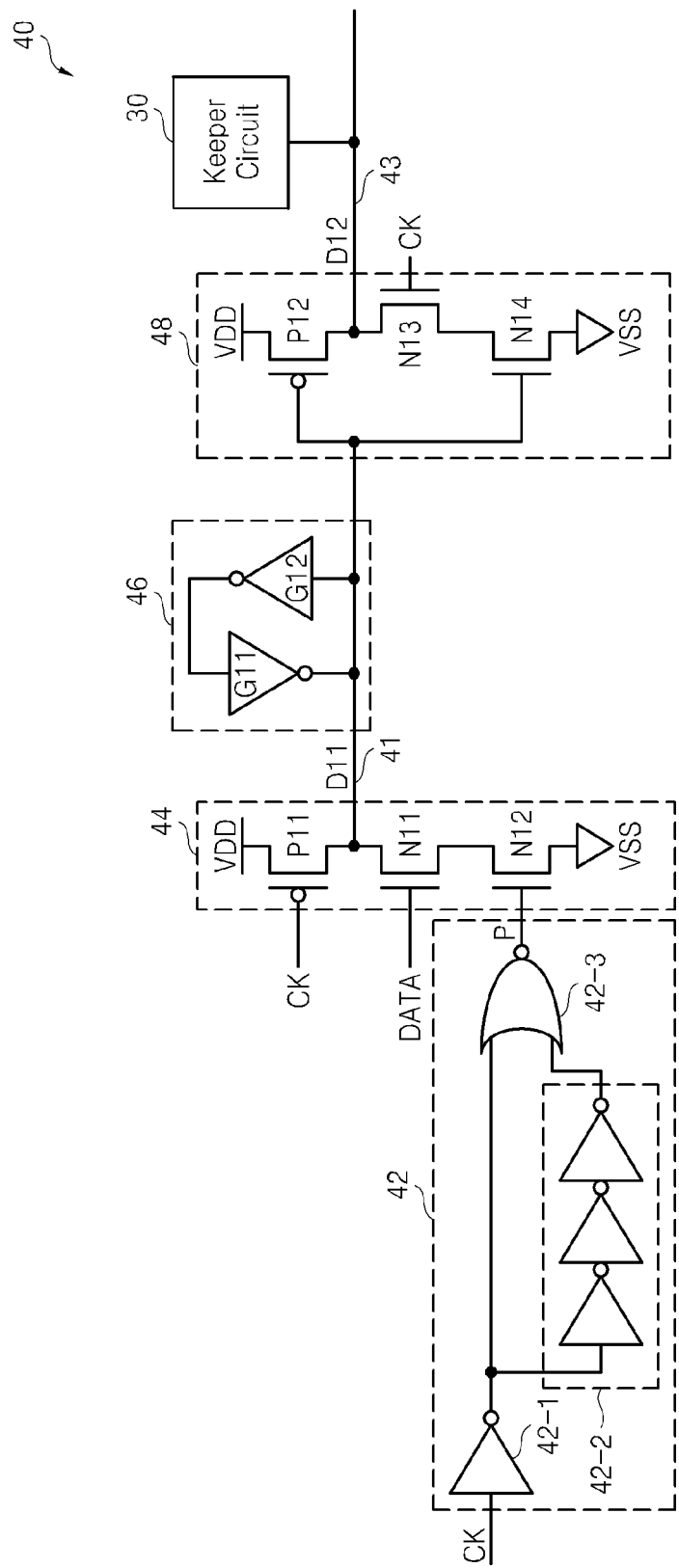
FIG. 6 is a circuit diagram of a flip-flop according to another exemplary embodiment of the present general inventive concept.

FIG. 6 is a circuit diagram of a flip-flop 40 according to another exemplary embodiment of the present general inventive concept. Referring to FIG. 6, the flip-flop 40 includes a pulse generator 42, a first transmission circuit 44, a latch circuit 46, a second transmission circuit 48, and the keeper circuit 30.

The pulse generator 42 includes an inverter 42-1, a delay circuit 42-2, and a NOR gate 42-3. The delay circuit 42-2 includes a plurality of inverters connected in series. The pulse generator 42 generates a pulse signal P using the clock signal CK and outputs the pulse signal P to the first transmission circuit 44. The pulse signal P assists in controlling the output of the first transmission circuit 44, as discussed further below. Further, since the pulse generator includes the delay circuit 42-3, there is a moment where clock signal CK and the pulse signal P exist in the same state. That is, there is a moment when the clock signal CK and the pulse signal P simultaneously exist in either a high state or a low state. Accordingly, when both the clock signal CK and the pulse signal P exist at a low state, the output of the NOR gate 42-3 is high.

The first transmission circuit 44 includes a first PMOS transistor P11, a first NMOS transistor N11, and a second NMOS transistor N12 which are connected in series between a power supply VDD and a ground VSS. A drain of the first PMOS transistor P11 and a drain of the first NMOS transistor N11 are connected to a first transmission line 41. The first transmission circuit 44 determines whether to transmit the data DATA received at the gate of the first NMOS transistor N11 in response to the clock signal CK and the pulse signal P.

More specifically, the first PMOS transistor P11 is switched in response to the clock signal CK received at the gate. The first PMOS may pull up the first transmission line 41 to the voltage level of the power supply VDD in response to the clock signal CK at the low level. Alternatively, the first NMOS transistor N11 and the second NMOS transistor N12 pull down the first transmission line 41 to the voltage level of the ground VSS in response to the data DATA and the pulse signal P, respectively.

For instance, the first NMOS transistor N11 may be turned on or off in response to the data DATA received at its gate. The second NMOS transistor N12 may be turned on or off in response to the pulse signal P generated by the pulse generator 42, which is received by the gate of the second NMOS transistor N12. As mentioned above, there is a moment when the clock signal CK and the pulse signal P simultaneously exist in at a low state such that the output of the NOR gate 42-3 is high. Accordingly, when the input data DATA received at the gate of the first NMOS N12 is high and the output of the NOR gate 42-3 is high, the first transmission line 41 may be pulled down to the voltage level of the ground VSS.

The latch circuit 46 includes inverters G11 and G12 connected in series. For example, the latch circuit 46 may include the two inverters G11 and G12 as illustrated in at least one exemplary embodiment shown in FIG. 6. Alternatively, it is appreciated that at least one of the two inverters G11 and G12 may be replaced by a tri-state inverter that operates in response to the clock signal CK and the complementary clock signal CKB in other exemplary embodiments.

The flip-flop illustrated in FIG. 6 may further include a latch circuit 46 and a second transmission circuit 48. The latch circuit 46 latches data D11 of the first transmission line 41 to prevent the data D11 from being distorted by a leakage path. The second transmission circuit 48 transmits data D12 to the second transmission line 43 in response to the clock signal CK and the data D11 of the first transmission line 41. The second transmission circuit 48 includes a second PMOS transistor P12, a third NMOS transistor N13, and a fourth NMOS transistor N14, which are connected in series between the power supply VDD and the ground VSS.

A drain of the second PMOS transistor P12 and a drain of the third NMOS transistor N13 are connected to a second transmission line 43. The second PMOS transistor P12 and the fourth NMOS transistor N14 operate complementarily to each other in response to the data D11 of the first transmission line 41. The third NMOS transistor N13 is turned on or off in response to the clock signal CK. The keeper circuit 30 latches the data D12 of the second transmission line 43. The keeper circuit 30 illustrated in FIG. 6 may be implemented by the keeper circuit 30a or 30b illustrated in FIG. 4 or 5.

The operations of the flip-flop 40 will be described with reference to FIGS. 4 and 6. The first transmission circuit 44 may transmit the data D11 at a high level (e.g., "1") or a low level (e.g., "0") to the first transmission line 41 in response to the clock signal CK, the data DATA, and the pulse signal P, as discussed above.

The latch circuit 46 latches the data D11 of the first transmission line 41 so as to keep the data D11 even if a leakage path occurs in the first transmission line 41.

The second transmission circuit 48 inverts the data D11 of the first transmission line 41 according to the level of the clock signal CK and transmits the data D12 at a high level or a low level to the second transmission line 43 according to an inversion result. For instance, when the clock signal CK is at the high level and the data D11 of the first transmission line 41 is at the high level, the data D12 at the low level is transmitted to the second transmission line 43.

When the clock signal CK is at the high level and the data D11 of the first transmission line 41 is at the low level, the second PMOS transistor P12 is turned on, and therefore, the data D12 at the high level is transmitted to the second transmission line 43. When the clock signal CK is at the low level and the data D11 of the first transmission line 41 is at the low level, the second PMOS transistor P12 is turned on, and therefore, the second transmission circuit 48 provides the voltage level of the power supply VDD to the second transmission line 43 through the second PMOS transistor P12. As a result, the data D12 of the second transmission line 43 is at the high level. The keeper circuit 30 latches the data D12 of the second transmission line 43.

Figure 7:
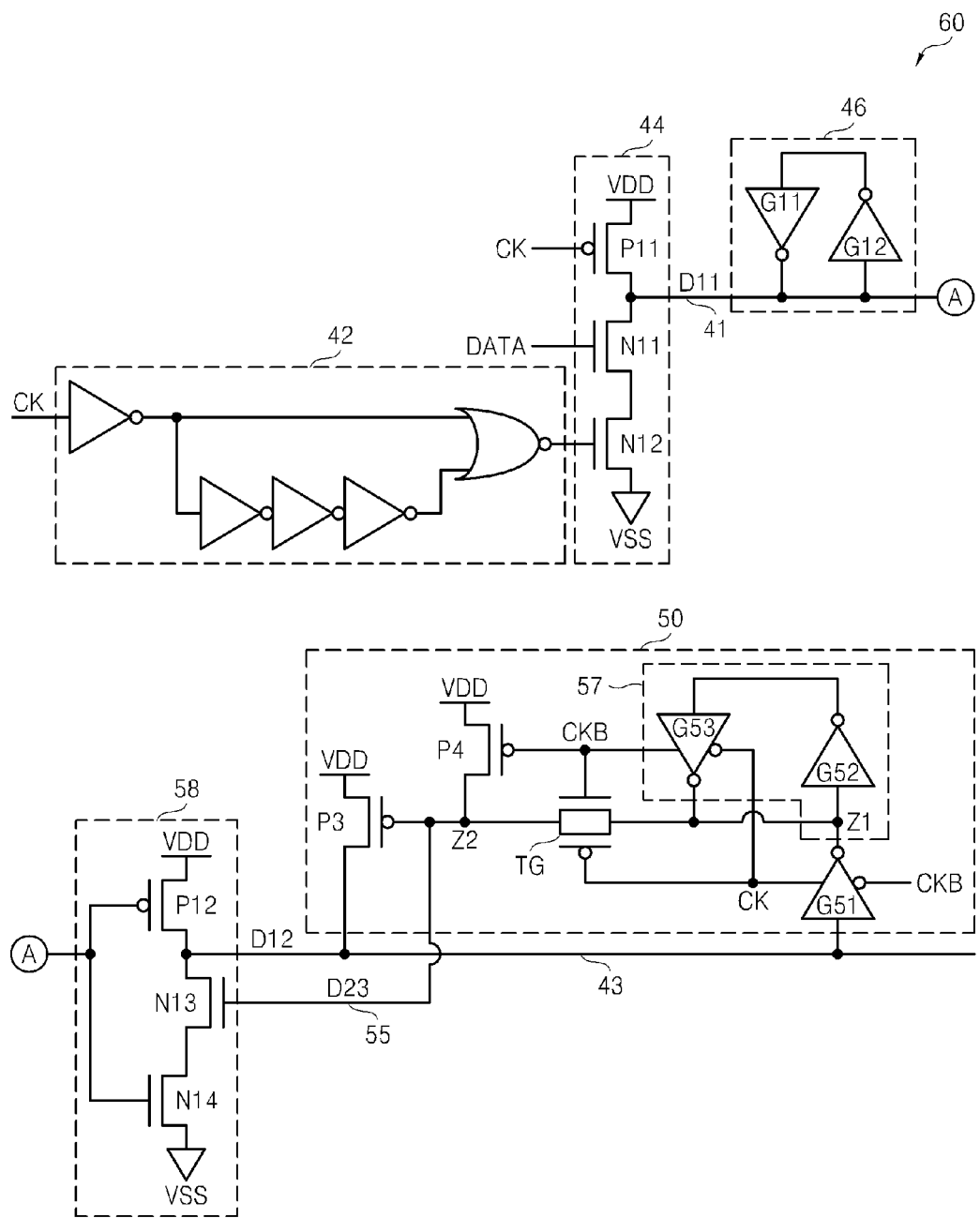
FIG. 7 is a circuit diagram of a flip-flop according to another exemplary embodiment of the present general inventive concept.

FIG. 7 is a circuit diagram of a flip-flop 60 according to further embodiments of the present general inventive concept. Referring to FIGS. 6 and 7, the flip-flop 60 includes the pulse generator 42, the first transmission circuit 44, the latch circuit 46, a second transmission circuit 58, and a keeper circuit 50.

The pulse generator 42, the first transmission circuit 44, and the latch circuit 46 illustrated in FIG. 7 have substantially the same structures as those illustrated in FIG. 6. Thus, detailed descriptions of the elements 42, 44, and 46 in FIG. 7 will be omitted.

The structure of the second transmission circuit 58 is substantially the same as that of the second transmission circuit 48 illustrated in FIG. 6, with the exception that a gate of the third NMOS transistor N13 is connected to a third transmission line 55 in electrical communication with a keeper circuit 50, instead of directly receiving a the clock signal CK. Thus, detailed descriptions of the second transmission circuit 58 will be omitted.

The keeper circuit 50 according to the exemplary embodiment of FIG. 7 includes a tri-state inverter G51, a latch circuit 57, a switching circuit TG, a first precharge circuit P3, and a second precharge circuit P4.

The tri-state inverter G51 receives the data D12 transmitted on the second transmission line 43, and inverts the data D12 of the second transmission line 43 in response to the clock signal CK and the complementary clock signal CKB, similar to the tri-state inverter G1 discussed with respect to FIG. 4. The inverted signal generated by the tri-state inverter G51 is output to a first node Z1 to input to the latch circuit 57. The tri-state inverter G51 may be implemented as a normal inverter.

The latch circuit 57 latches the data of the first node Z1 in response to the clock signal CK and the complementary clock signal CKB. More specifically, the latch circuit 57 includes inverters G52 and G53 connected in series to each other. The inverter G53 may be implemented as a tri-state inverter operating in response to the clock signal CK and the complementary clock signal CKB.

The switching circuit TG transmits the data of the first node Z1 to a second node Z2 in response to the clock signal CK and the complementary clock signal CKB. The switching circuit TG may be implemented as a transmission gate.

The first precharge circuit P3 may precharge the second transmission line 43 to a high level in response to the data of the second node Z2. The first precharge circuit P3 may be a PMOS transistor. The second precharge circuit P4 may precharge the third transmission line 55 to a high level, e.g., the voltage level of the power supply VDD, in response to the complementary clock signal CKB. Accordingly, the second precharge circuit P4 may act to selectively provide the complementary clock signal CKB to the gate of the third NMOS N13, which thereby operates second transmission circuit 58 similarly to that of second transmission circuit 48 of FIG. 6, as discussed further below. The second precharge circuit P4 may be a PMOS transistor.

The operations of the flip-flop 60 will be described with reference to FIGS. 6 and 7. The procedure to transmit the data D11 from the first transmission circuit 44 to the first transmission line 41 is the same as that described above with reference to FIG. 6. Thus, detailed descriptions thereof will be omitted.

When the data D11 of the first transmission line 41 is at the high level and the clock signal CK is at the high level, the second precharge circuit P4 provides the voltage level of the power supply VDD to the gate of the third NMOS transistor N13 in response to the complementary clock signal CKB at the low level. As a result, the data D12 of the second transmission line 43 is at the low level.

At this time, the tri-state inverter G51 inverts the data D12 at the low level in the second transmission line 43 in response to the clock signal CK and the complementary clock signal CKB and transmits the inverted data to the first node Z1. As a result, the data of the first node Z1 is at the high level.

When the data D11 of the first transmission line 41 is at the high level and the clock signal CK transits from the high level to the low level, the data at the high level at the first node Z1 is latched by the latch circuit 57 and provided to the third NMOS transistor N13 through the switching circuit TG and the third transmission line 55. Accordingly, the first precharge circuit P3 is turned off and the data D12 of the second transmission line 43 is kept at the low level.

When the data D11 of the first transmission line 41 is at the low level and the clock signal CK is at the high level, the second PMOS transistor P12 is turned on and the fourth NMOS transistor N14 is turned off. As a result, the data D12 of the second transmission line 43 is at the high level.

The tri-state inverter G51 outputs data at a low level to the first node Z1 in response to the clock signal CK and the complementary clock signal CKB. The inverter G52 inverts the data of the first node Z1.

When the data D11 of the first transmission line 41 is at the low level and the clock signal CK transits from the high level to the low level, the second precharge circuit P4 is turned off in response to the complementary clock signal CKB at the high level. At this time, the data of the first node Z1 is latched at the low level by the tri-state inverter G53 of the latch circuit 57 and the data at the low level at the node Z1 is transmitted to the second node Z2 through the switching circuit TG.

The first precharge circuit P3 is turned on in response to the data at the low level at the node Z2, and therefore, the data D12 of the second transmission line 43 is kept at the high level. Consequently, the flip-flop 60 is insensitive to coupling noise occurring in the second transmission line 43.

Figure 8:
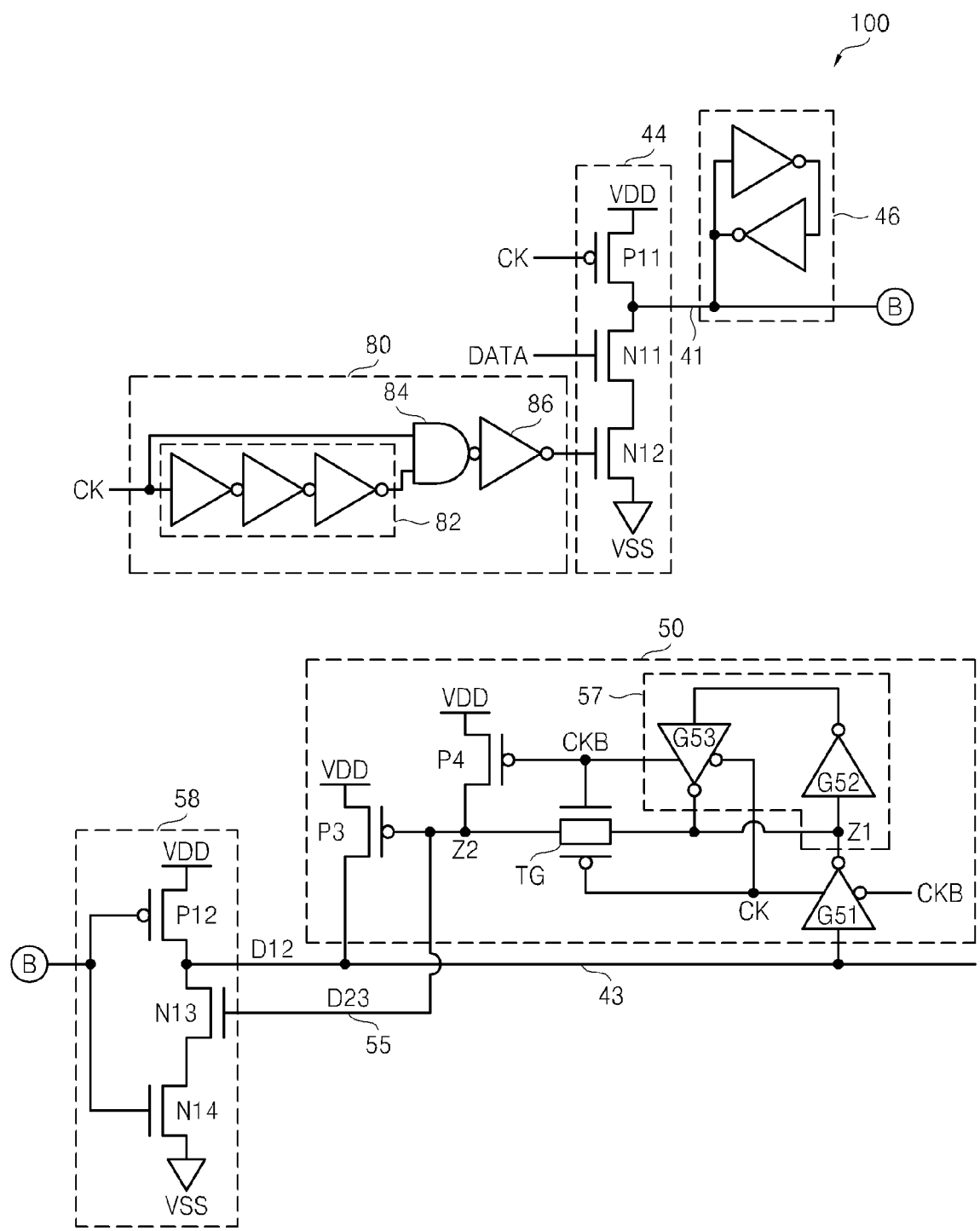
FIG. 8 is a circuit diagram of a flip-flop according to another exemplary embodiment of the present general inventive concept.

FIG. 8 is a circuit diagram of a flip-flop 100 according to another exemplary embodiment of the present general inventive concept. The flip-flop 100 illustrated in FIG. 8 has substantially the same structure as the flip-flop 60 illustrated in FIG. 7, with the exception that a pulse generator 80 includes a delay circuit 82, a NAND gate 84, and an inverter 86.

The delay circuit 82 includes a plurality of inverters connected in series to one another and delays the clock signal CK. The NAND gate 84 performs a NAND operation on the clock signal CK and an output signal of the delay circuit 82. The inverter 86 inverts an output signal of the NAND gate 84. The second NMOS transistor N12 is turned on or off according to an output signal of the inverter 86.

Figure 9:
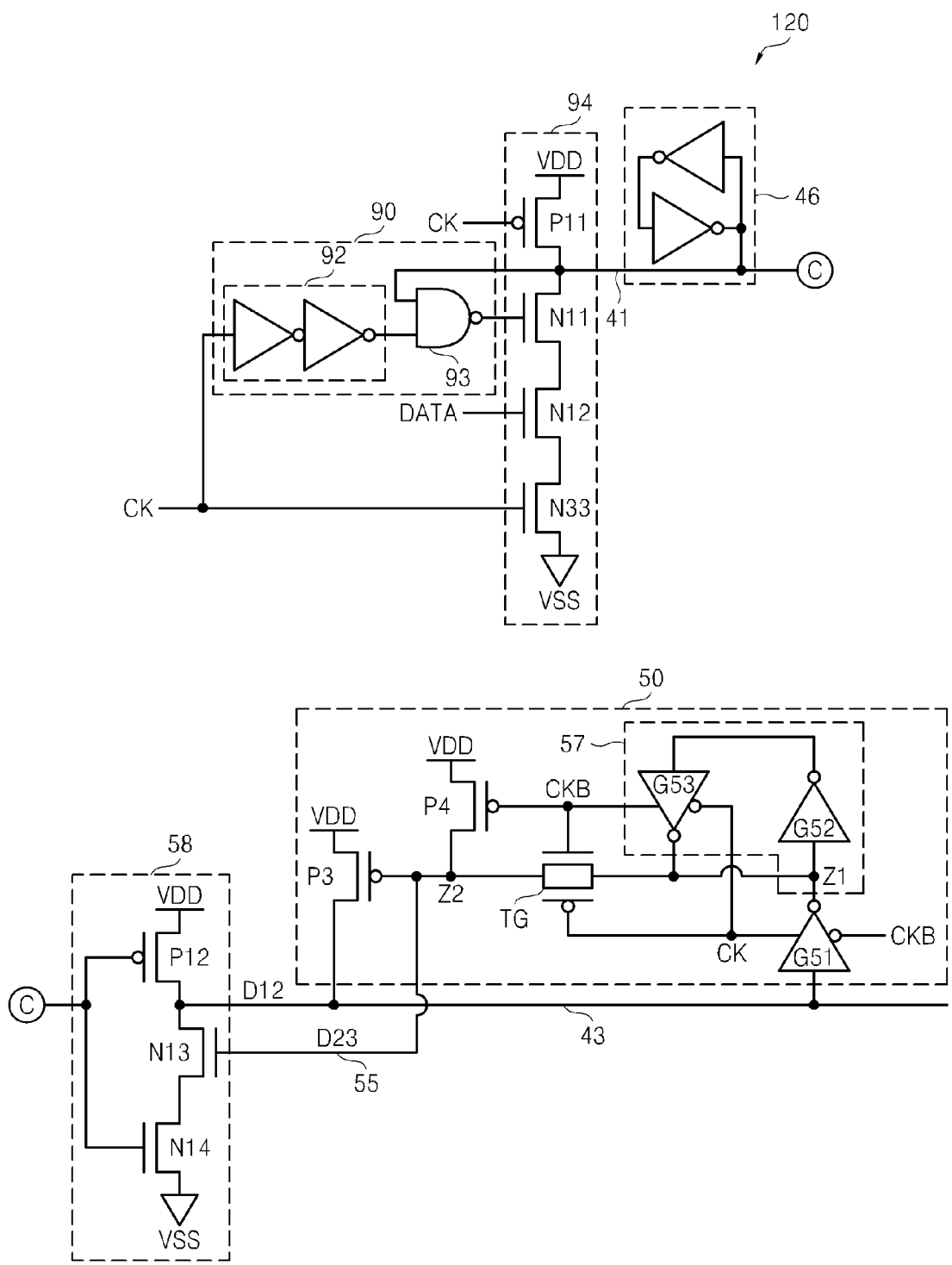
FIG. 9 is a circuit diagram of a flip-flop according to another exemplary embodiment of the present general inventive concept.

FIG. 9 is a circuit diagram of a flip-flop 120 according to another exemplary embodiment of the present general inventive concept. The structure of the flip-flop 120 is substantially the same as that of the flip-flop 60 illustrated in FIG. 7, except for a pulse generator 90 and a first transmission circuit 94.

The pulse generator 90 includes a delay circuit 92 and a NAND gate 93. The delay circuit 92 includes a plurality of inverters connected in series to one another and delays the clock signal CK. The NAND gate 93 performs a NAND operation on an output signal of the delay circuit 92 and a signal of the first transmission line 41. An output signal of the NAND gate 93 is applied to the gate of the first NMOS transistor N11.

The first transmission circuit 94 includes the first PMOS transistor P11, the first NMOS transistor N11, the second NMOS transistor N12, and a fifth NMOS transistor N33. The data DATA is applied to the gate of the second NMOS transistor N12 and the clock signal CK is applied to the gate of the fifth NMOS transistor N33.

Figure 10:
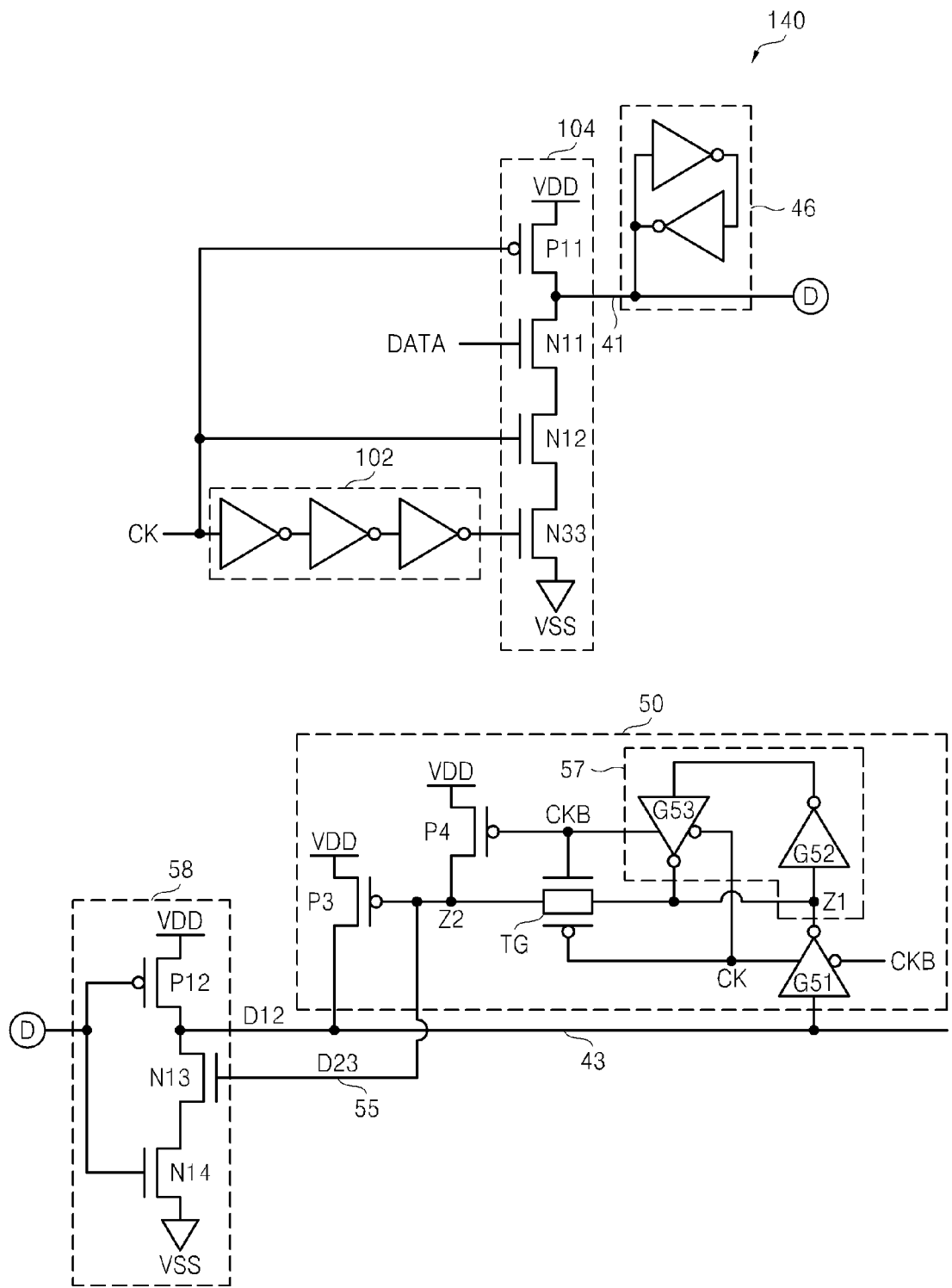
FIG. 10 is a circuit diagram of a flip-flop according to another exemplary embodiment of the present general inventive concept.

FIG. 10 is a circuit diagram of a flip-flop 140 according to another exemplary embodiment of the present general inventive concept. The structure of the flip-flop 140 is substantially the same as that of the flip-flop 60 illustrated in FIG. 7, except for a delay circuit 102 and a first transmission circuit 104.

The delay circuit 102 includes a plurality of inverters connected in series to one another. The first transmission circuit 104 includes the first PMOS transistor P11, the first NMOS transistor N11, the second NMOS transistor N12, and a fifth NMOS transistor N33. The clock signal CK is applied to the gate of the first PMOS transistor P11, the gate of the second NMOS transistor N12, and an input terminal of the delay circuit 102. The data DATA is applied to the gate of the first NMOS transistor N11. An output signal of the delay circuit 102 is applied to the fifth NMOS transistor N33.

As described above, according to at least one exemplary embodiment of the present general inventive concept, a flip-flop includes a keeper circuit to keep data constant, thereby preventing data stored in the flip-flop from being distorted by coupling noise. Accordingly, an operating speed of the flip-flop may be increased.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A flip-flop comprising:
    a transmission circuit configured to transmit data to a transmission line in response to a clock signal; and
    a keeper circuit comprising:
        a first tri-state inverter configured to invert the data of the transmission line in response to the clock signal;
        a latch circuit configured to latch data output from the first tri-state inverter; and
        an inverter configured to transmit the latched data output from the latch circuit to the transmission line as an output of the flip-flop while the first tri-state inverter is turned off.

2. The flip-flop of claim 1, wherein the latch circuit comprises a plurality of inverters connected in series to one another.

3. The flip-flop of claim 1, wherein the inverter is a second tri-state inverter which operates in response to the clock signal.

4. The flip-flop of claim 1, further comprising an inverter connected between the transmission line and the output of the flip-flop.

5. The flip-flop of claim 1, wherein the transmission circuit comprises a tri-state inverter configured to transmit the data to the transmission line in response to the clock signal.

6. A flip-flop comprising:
    a first transmission circuit configured to transmit data to a first transmission line in response to a clock signal;
    a first latch circuit configured to latch data of the first transmission line;
    a second transmission circuit configured to transmit the data of the first transmission line to a second transmission line in response to the clock signal; and
    a keeper circuit configured to latch the data of the second transmission line in response to the clock signal, and to keep the data of the second transmission line constant,
    wherein the keeper circuit comprises:
        a tri-state inverter configured to invert the data of the second transmission line in response to the clock signal;
        a second latch circuit configured to latch data output from the tri-state inverter; and
        an inverter configured to transmit data output from the second latch circuit to the second transmission line as an output of the flip-flop while the tri-state inverter is turned off.

7. The flip-flop of claim 6, wherein the second latch circuit comprises a plurality of inverters connected in series to one another.

8. The flip-flop of claim 7, wherein one of the plurality of inverters is a tri-state inverter which operates in response to the clock signal.

9. The flip-flop of claim 6, wherein the first transmission circuit comprises a tri-state inverter configured to transmit the data to the first transmission line in response to the clock signal.

10. A flip-flop comprising:
    a first transmission circuit configured to transmit data to a first transmission line in response to a clock signal and a complementary clock signal;
    a first latch circuit configured to latch data of the first transmission line;
    a second transmission circuit configured to transmit the data of the first transmission line to a second transmission line in response to the data of the first transmission line and data of a third transmission line; and
    a keeper circuit configured to latch the data of the second transmission line constant in response to the clock signal, and to transmit latched data to the third transmission line,
    wherein the keeper circuit comprises:
        a tri-state inverter configured to invert and output the data of the second transmission line in response to the clock signal;
        a second latch circuit configured to latch data output from the tri-state inverter;
        a third transmission circuit configured to transmit data output from the second latch circuit to the third transmission line in response to the clock signal;
        a first precharge circuit configured to precharge the second transmission line in response to data of the third transmission line; and
        a second precharge circuit configured to precharge the third transmission line in response to the clock signal.

11. The flip-flop of claim 10, wherein the second latch circuit comprises a plurality of inverters connected in series to one another.

12. The flip-flop of claim 11, wherein one of the plurality of inverters is a tri-state inverter which operates in response to the clock signal.

* * * * *